A. POUCHAIN.
NEGATIVE PLATE FOR ELECTRIC ACCUMULATORS AND THE MANUFACTURE THEREOF.
APPLICATION FILED JUNE 22, 1920.
1,429,300.
Patented Sept. 19, 1922.
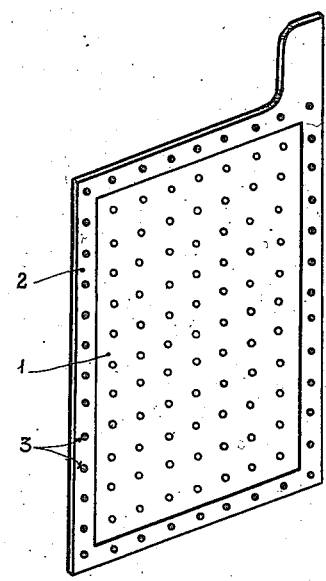
Inventor
Adolfo Pouchain
By Lawrence Langner
Attorney Patented Sept. 19, 1922.

1,429,300

UNITED STATES PATENT OFFICE.

ADOLFO POUCHAIN, OF TURIN, ITALY.

NEGATIVE PLATE FOR ELECTRIC ACCUMULATORS AND THE MANUFACTURE THEREOF.

Application filed June 22, 1920. Serial No. 390,917.

*To all whom it may concern:*

Be it known that I, ADOLFO POUCHAIN, a subject of the King of Italy, and resident of Turin, Italy, have invented certain new and useful Improvements in Negative Plates for Electric Accumulators and the Manufacture Thereof, of which the following is a specification.

This invention relates to negative plates for electric accumulators and has for its object to prevent a more intense electro-chemical action on the edges of the plate than on the other parts thereof during the charging and discharging of the accumulator.

It is known that in lead-zinc accumulators both the deposition of the zinc during charging and its erosion by the electrolyte during discharge tend to occur preferably at the edges of the plate and that when the plate is formed of a support, whether a conductor of electricity or not, covered with a layer of zinc, the latter is attacked and destroyed most easily at the edges of the plate.

According to the present invention this drawback is minimized by applying to the edges of the plate an insulating coating the effect of which is to reduce or prevent action between the plate and the electrolyte.

Such a covering may be produced by applying to the edges of the plate celluloid or the like in liquid form to produce an insulating skin capable of protecting the edges of the plate from the action of the electrolyte.

In the figure of the accompanying drawing is shown in perspective a negative accumulator plate to which the invention is applied.

The plate 1, which may be of any desired type, consisting of a plate of zinc or of a conducting or non-conducting support covered with zinc, has at its edges a layer 2 of insulating varnish, such as a celluloid varnish.

For applying the layer 2 the plate is first perforated as at 3 near its edges and then there is applied to the edges, for instance by a brush, a layer of liquid insulating varnish. The varnish penetrates the perforations 3 and forms between the layers covering the two faces of the edges, ties which act as keys or rivets when the varnish has solidified and hardened. In this manner the covering is caused to adhere perfectly to the edges of the plate so that the edges are held within a frame of insulating material completely protecting them from action of the electrolyte.

In a plate comprising such an insulating frame there is no more deposition or erosion at the edges of the plate than elsewhere and the deposition as well as the erosion of zinc occurs uniformly in the central zone which, as is known, is more effective than the edges in the operation of the accumulator.

What I claim as my invention and desire to secure by United States Letters Patent is:—

1. A method of reducing the electro-chemical actions on the borders of the active material of negative plates for electric accumulators, consisting in perforating the borders of the plate, and applying a layer of insulating varnish on the opposite faces of the plate along said borders so that the varnish will be caused to enter the perforations therein and form keys for connecting the two layers together.

2. A method of reducing the electro-chemical actions on the borders of the active material of negative plates for electric accumulators, consisting in perforating the borders of the plate, applying a layer of insulating varnish on the opposite faces of the plate along said borders, and causing said varnish to enter said perforations and fc..m keys for connecting the two layers together.

3. A method of reducing the electro-chemical actions on the borders of the active material of negative plates for electric accumulators, consisting in perforating the borders of the plate, applying a layer of celluloid solution on the opposite faces of the plate along said borders, and causing said celluloid solution to enter said perforations and form keys for connecting the two layers together.

4. A negative plate for electric accumulators having its borders traversed by holes and covered with a layer of celluloid extending over the edges of the active material and filling said holes.

Signed at Turin, Italy, this 26th of May, 1920 A. D.

ADOLFO POUCHAIN.